(12) United States Patent
Wise et al.

(10) Patent No.: US 8,256,365 B2
(45) Date of Patent: Sep. 4, 2012

(54) CHECK VALVE BOAT PLUG SYSTEMS

(76) Inventors: George Wise, Mesa, AZ (US); Thomas Brackett, Mesa, AZ (US)

( * ) Notice: Subject to any disclaimer, the term of this patent is extended or adjusted under 35 U.S.C. 154(b) by 181 days.

(21) Appl. No.: 12/790,328

(22) Filed: May 28, 2010

(65) Prior Publication Data

US 2010/0300343 A1 Dec. 2, 2010

Related U.S. Application Data

(60) Provisional application No. 61/182,541, filed on May 29, 2009.

(51) Int. Cl.
*B63B 13/00* (2006.01)
(52) U.S. Cl. .......................................... 114/197
(58) Field of Classification Search .................. 114/173, 114/183 R, 197, 198
See application file for complete search history.

(56) References Cited

U.S. PATENT DOCUMENTS

| | | | | |
|---|---|---|---|---|
| 847,112 A * | 3/1907 | Renton | .......................... | 114/197 |
| 2,772,648 A * | 12/1956 | De Persia | ...................... | 114/185 |
| 2,929,347 A * | 3/1960 | Veltman | ..................... | 114/183 R |
| 6,357,376 B1 * | 3/2002 | Purio | ............................. | 114/197 |
| 6,615,760 B1 * | 9/2003 | Wise et al. | ..................... | 114/197 |

* cited by examiner

*Primary Examiner* — Lars A Olson
(74) *Attorney, Agent, or Firm* — Schmeiser, Olsen & Watts LLP

(57) ABSTRACT

A boat plug system for automatically sealing a boat. The boat plug system is mounted in a drain hole passing through the boat's transom and includes: a cylindrical-shaped plug; a ball valve assembly removably coupled within the cylindrical-shaped plug; and further comprising a ball, a sealing ball seat component having a frustroconical shape to receive the ball when the ball valve assembly is in the sealed position, and at least one screen; and a plug cap/tool further comprising a tool head on one side for removably coupling the ball valve assembly within the cylindrical-shaped plug and an opposite side of the plug cap/tool from the tool head is for sealing the cylindrical-shaped plug. Water may flow out of the boat's drain hole, but is substantially stopped from flowing from the exterior of the boat to the interior via the drain hole.

13 Claims, 4 Drawing Sheets

CHECK VALVE BOAT PLUG SYSTEMS

CROSS-REFERENCE TO RELATED APPLICATIONS

This patent application claims priority to U.S. Provisional Application No. 61/182,541 filed on May 29, 2009, the contents of which are incorporated herein by reference.

BACKGROUND OF THE INVENTION

1. Field of the Invention

The present invention relates generally to the field of plugs and more specifically relates to boat plugs.

2. Description of the Related Art

Recreational and commercial boating is very popular throughout the world. During boating excursions it is very common to get water within the boat that may be drained at a later time such as when the boat is removed from the water. Problems exist should the boat become swamped during use in the middle of a body of water due to poor weather, damage to the boat bottom, or choppy wave conditions. Should this occur the lives of the occupants may be endangered as well as the boat may be potentially damaged or lost. To account for this, boats are typically provided with drain holes and/or bailing devices.

Bailing devices may be impractical when any volume of water has entered the boat. Normally the occupants are not able to bail quickly enough to save the boat from sinking. Attempts to devise an improved drain plug for the drain hole to solve the mentioned problem have been disclosed in U.S. Pat. Nos. 3,394,671, 3,550,548, 3,565,031, 4,217,846, 6,615,760. 6,615,760 to Wise et al. is incorporated by reference herein. These mentioned patents provide examples of apparatuses with various types of ball valves for automatically draining water from a boat that seal when the boat is not moving through the water.

These boat valves have their drawbacks however. These valve systems do not provide for easily disassembling the valve in order to clean or otherwise maintain the drain hole of the boat. Further, disassembly requires additional tools that need to be carried with the boat and may be easily misplaced or lost.

Accordingly, there is a need in the field of boat valves for an improved boat valve that allows for easy disassembly.

BRIEF SUMMARY OF THE INVENTION

The boat plug system of the present invention is mounted in a drain hole passing through the boat's transom and includes: a cylindrical-shaped plug with two opposed openings; a ball valve assembly removably mounted within the cylindrical-shaped plug, wherein the ball valve assembly further comprises a ball, and a sealing ball seat component wherein the sealing ball seat component is shaped to receive the ball when the ball valve assembly is in the sealed position; and a plug cap/tool for removably mounting the ball valve assembly within the cylindrical-shaped plug and for sealing at least one of the two opposed openings in the cylindrical-shaped plug. Water may flow out of the boat's drain hole, but is substantially stopped from flowing from the outside of the boat to the inside via the drain hole. This stoppage is provided when the ball is seated in a sealed position within the ball valve assembly.

An alternate embodiment of a boat plug system configured according to an embodiment of the present invention includes: a cylindrical-shaped plug with two opposed openings; a ball valve assembly removably coupled within the cylindrical-shaped plug; wherein the ball valve assembly further comprises a ball, a sealing ball seat component wherein the sealing ball seat component has a frustroconical shape to receive the ball when the ball valve assembly is in the sealed position, and at least one screen; and a plug cap/tool comprising a tool head on one end for removably coupling the ball valve assembly within the cylindrical-shaped plug. In some embodiments the ball valve assembly includes a tool receiver shaped to receive the tool head. In some embodiments the cylindrically shaped plug is internally threaded. In some embodiments the ball valve assembly is threaded for removably coupling within the cylindrical-shaped plug. In some embodiments the plug cap/tool further comprises a threaded coupling for removably coupling to the cylindrical-shaped plug. In some embodiments the ball valve assembly is threaded into the cylindrical-shaped plug in response to rotation of the tool head inserted into the tool receiver. In some embodiments both the ball valve assembly and the threaded coupling of the plug cap/tool are threaded into the cylindrical plug. In some embodiments the ball valve assembly is removed from the cylindrical-shaped plug in response to rotation of the tool head inserted into the tool receiver.

A method of use is provided herein for a boat plug system comprising the following steps: installing a cylindrical shaped plug into a boat's drain hole; installing a ball valve assembly into a cylindrical-shaped plug using a plug cap/tool; removing the plug cap/tool from the ball valve assembly; and installing the plug cap/tool into the cylindrical-shaped plug. The method of use may also comprise the following optional steps: removing the boat from the water; disassembling the boat plug system, cleaning the interior of the boat plug system, and reassembling the boat plug system for subsequent use.

The present invention holds significant improvements and serves as a check valve boat plug system. These and other features, aspects, and advantages of the present invention will become better understood with reference to the following drawings and description.

BRIEF DESCRIPTION OF THE DRAWINGS

The various embodiments of the present invention will hereinafter be described in conjunction with the appended drawings, wherein like designations denote like elements.

DETAILED DESCRIPTION

Figure 1:
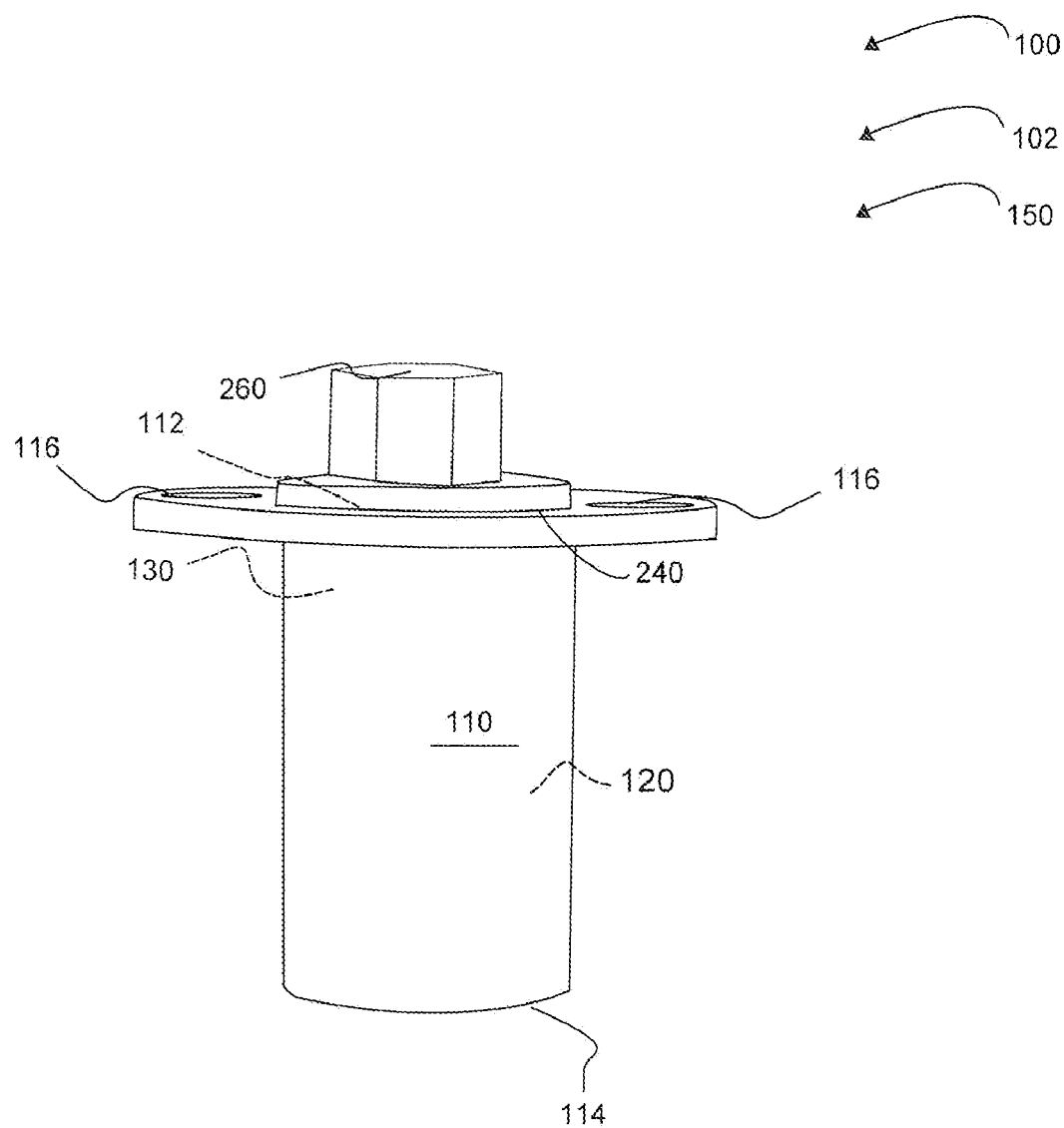
FIG. 1 shows a perspective view illustrating an assembled check valve boat plug system according to an embodiment of the present invention.

Referring now to FIG. 1, showing a perspective view illustrating an assembled check valve boat plug system 100 according to an embodiment of the present invention. Check valve boat plug system 100 is designed to permit a user to drain water from a boat while the boat is in use, using a one-way valve.

Boat draining apparatus 102 is mounted in a drain hole passing through the boat's transom and comprises: cylindrical-shaped plug 110 with two opposed openings including a proximate and a distal opening 112 and 114, respectively; ball valve assembly 120 that is removably mounted within cylindrical-shaped plug 110; and plug cap/tool 130. Check valve boat plug system 100, when mounted is designed to be substantially flush with bottom of boat to minimize damage to check valve boat plug system 100 and to boat in shallow water.

Boat draining apparatus 102 is shown in its assembled condition 150 as it would be installed in a boat drain plug. Boat draining apparatus 102 of the present invention is durable, inexpensive, reliable, effective, and substantially easy to mount in an existing drain plug hole in the transom of a boat. Further, boat draining apparatus 102 is substantially easy to quickly disassemble, clean, maintain, and reassemble.

Figure 2:
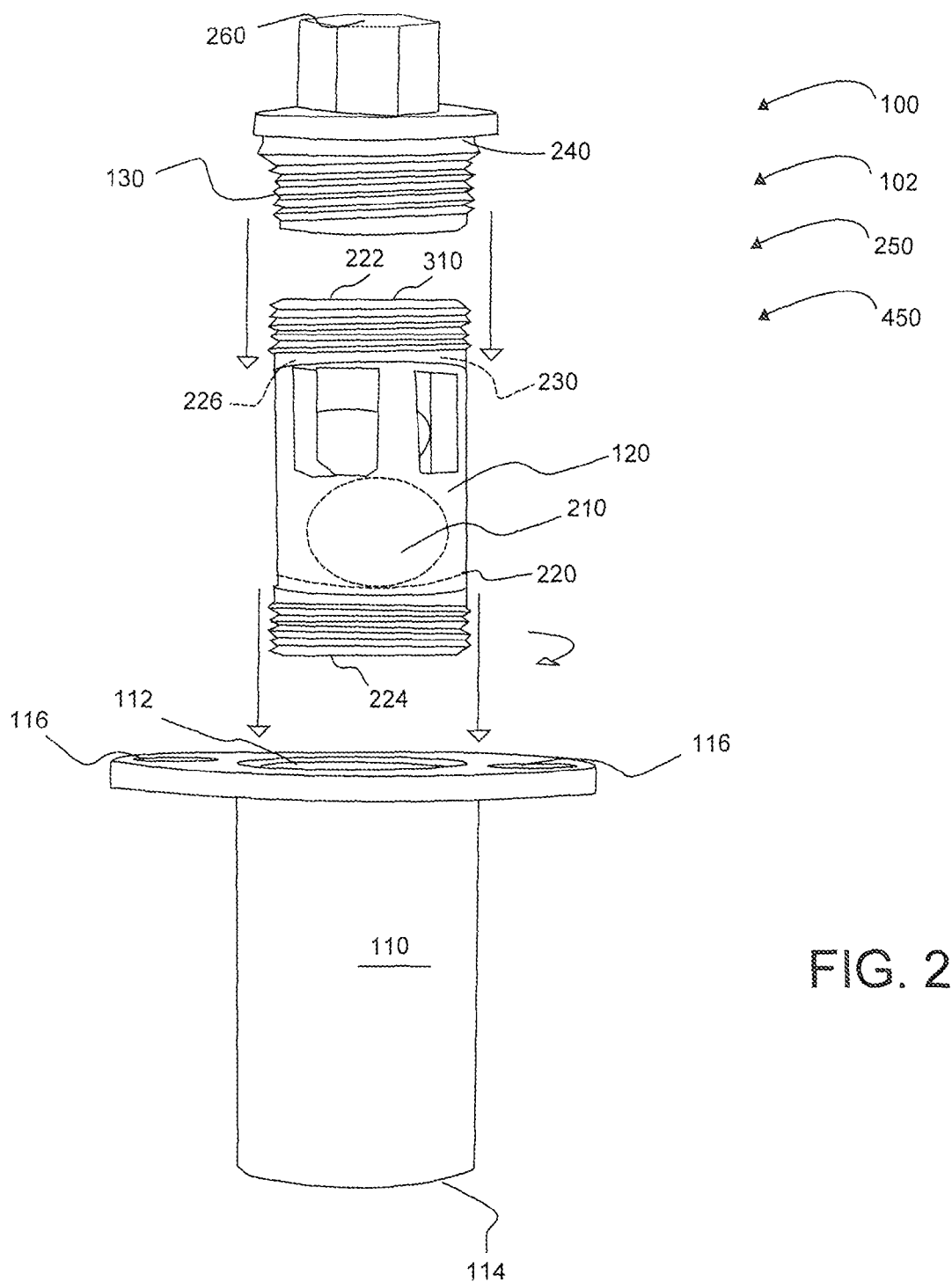
FIG. 2 is a perspective side view illustrating the components of the unassembled check valve boat plug system according to an embodiment of the present invention of FIG. 1.

Referring now to FIG. 2, showing a perspective side view illustrating the various components of the unassembled check valve boat plug system 100 according to an embodiment of the present invention of FIG. 1.

As mentioned previously in FIG. 1, boat draining apparatus 102 comprises: cylindrical-shaped plug 110; ball valve assembly 120 that is removably mounted within cylindrical-shaped plug 110; and plug cap/tool 130. The present figure shows the various components in unassembled condition 250.

Figure 3:
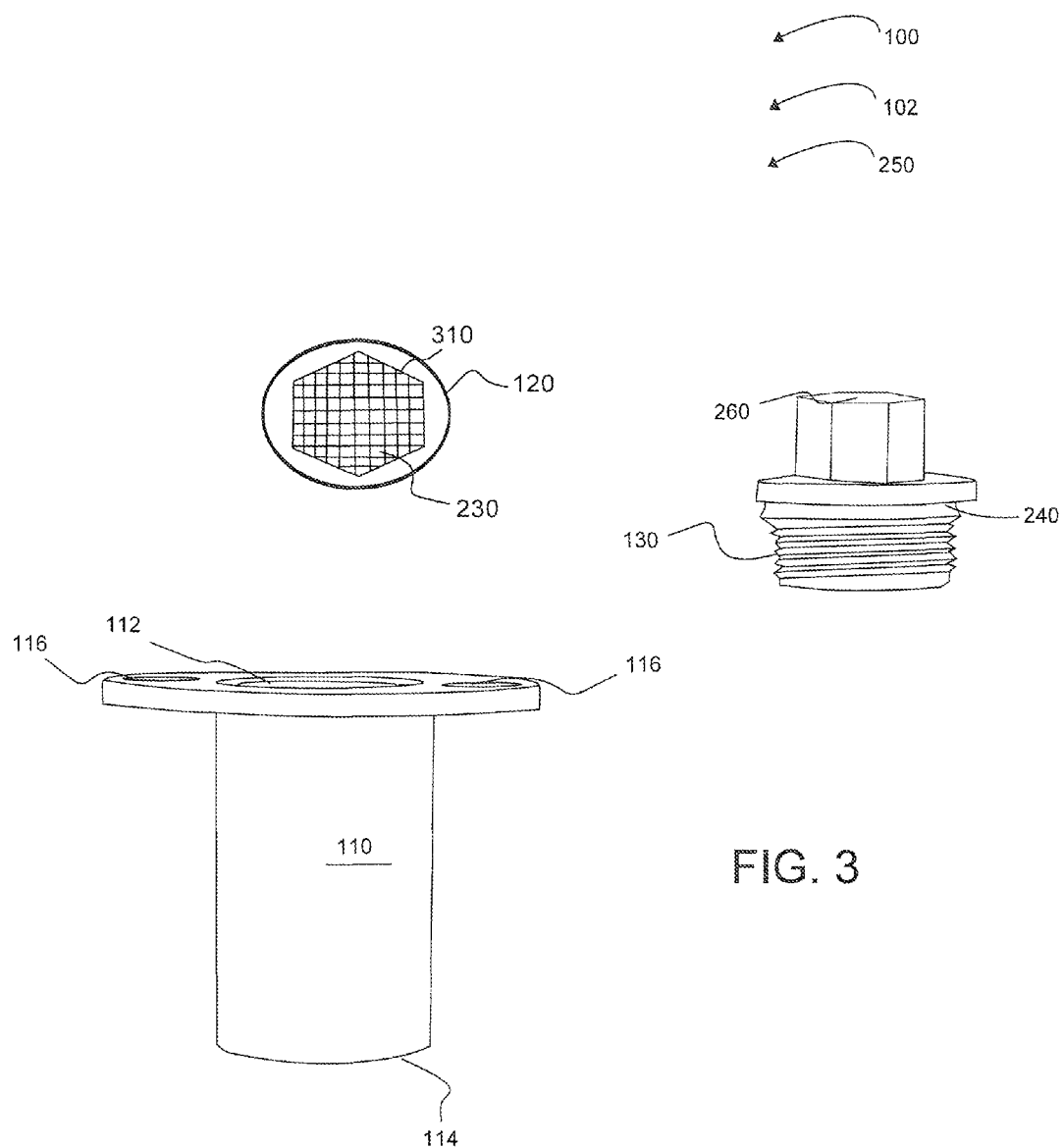
FIG. 3 is a perspective view illustrating an unassembled check valve boat plug system according to an embodiment of the present invention of FIG. 1
Figure 4:
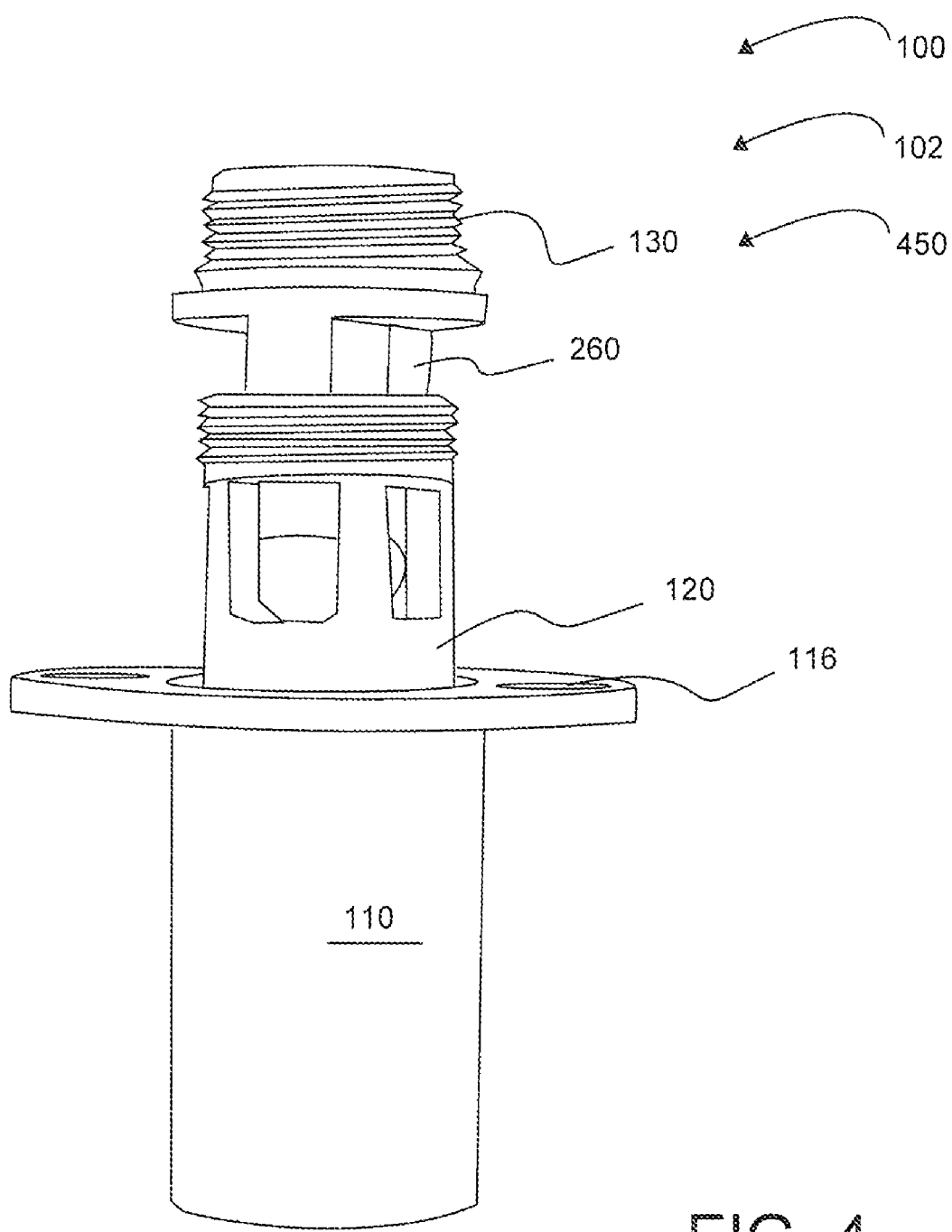
FIG. 4 is a perspective view illustrating assembly of the check valve boat plug system according to an embodiment of the present invention of FIG. 1.

Cylindrical-shaped plug 110 comprises a substantially cylindrical shape with proximate opening 112 and distal opening 114, as also shown in FIGS. 1, 3, and 4. Cylindrical-shaped plug 110 also comprises mounting tabs 116 to allow cylindrical-shaped plug 110 to be coupled to the boat using appropriate fastening means such as screws, bolts, rivets or other suitable alternatives. In assembled condition 150, ball valve assembly 120 is removably mounted within cylindrical-shaped plug 110 via threaded coupling or other suitable method or means. Threading is shown within this particular embodiment and occurs by rotating in the direction shown, as ball valve assembly 120 moves in the direction of the vertical arrows. It should be noted that coupling means may include other alternatives to threads such as snapping, bonding, friction-fitting, welding, keying, molding ball valve assembly 120 within cylindrical-shaped plug 110 as a single piece or other such alternatives. Proximate opening 112 and distal opening 114 may comprise female threads for accepting ball valve assembly 120, followed by plug cap/tool 130, as also shown in FIG. 4.

Ball valve assembly 120 comprises a proximate opening 222 and a distal opening 224. Ball valve assembly 120 further includes ball 210, sealing ball seat 220, screen(s) 230, gasket 240, and a one way flow-through ball seat component 226. As discussed in FIG. 1, water may flow out of the boat's drain hole, but is substantially stopped from flowing from the exterior of the boat to the interior via the drain hole. This stoppage is provided when ball 210 is seated in a sealed position within the ball valve assembly 120. Sealed position occurs when ball 210 is pushed by pressure of the water exterior to the boat into contact with sealing ball seat 220. The sealing seat 220 may be frustroconical in shape so as to receive the ball 210 and substantially seal the opening within the sealing ball seat 220. In this configuration, if the plug cap 130 is not properly secured, or if the gasket 240 is damaged or otherwise compromised, the ball 210 seated within the sealing seat 220 act to prevent water from entering the interior of the boat through opening 222. Gasket 240 provides sealing between plug cap/tool 130 and cylindrical-shaped plug 110. Cylindrical-shaped plug 110 is substantially sealed to the boat using fasteners as described in FIG. 1 and may also use a gasket or other sealing means to prevent seepage. When there is no water pressure acting on the ball 210 is not in contact with the sealing ball seat 220. For example, water that may have entered the interior of the boat during normal operation may be drained from the boat by removing the cap 130, thereby allowing water within the boat to drain out. As water pressure builds from within the boat, the ball 210 is force toward proximate opening 222 and into a one way flow-through ball seat component 226, but does not seal the proximate opening 222, allowing water to drain through the draining apparatus 102. This is the unsealed position of the ball valve assembly 120. In this manner, the present invention provides a one-way check valve boat plug system 100.

Plug cap/tool 130 may comprise a tool head 260 and male threads or other sealing means on the opposing end, allowing plug cap/tool 130 to be removably coupled into cylindrical-shaped plug 110, as demonstrated in FIG. 4. Plug cap/tool 130 may comprise other shapes and number of sides however this hexagonal shape has been used within the present embodiment, because it is convenient when using typical wrench sets. Ideally the present invention requires no tools and is self-contained for maintenance purposes in remote locations. Tool head 260 of plug cap/tool 130 may serve to provide a means to tighten ball valve assembly 120 into a removably coupled relationship to cylindrical-shaped plug 110. In this manner plug cap/tool 130 of boat draining apparatus 102 serves a dual purpose of preventing water from entering the boat and as a tool to tighten or loosen ball valve assembly 120 for cleaning debris out of screen 230. As mentioned, this feature permits the user to use and maintain check valve boat plug system 100 with no extra tools. Ball valve assembly 120 is threaded into cylindrical-shaped plug 110 until stop is reached and/or until there is enough remaining thread to allow plug cap/tool 130 to also be installed into cylindrical-shaped plug 110. Use of plug cap/tool 130 is illustrated and described more succinctly in FIG. 4. Plug cap/tool 130 is then tightened down to meet upper surface of cylindrical-shaped plug 110. Gasket 240 may be slightly compressed between the two surfaces thereby sealing off from leakage. Gasket 240 may comprise rubber or plastic material.

Within this particular embodiment, should user forget to install plug cap/tool 130, ball valve assembly 120 will substantially prevent water from entering the boat because it only allows water to pass outwardly from the boat into the body of water, in a single direction only, as previously explained. In this way, check valve boat plug system 100 provides a redundant safety measure to protect the user's property.

Referring now to FIG. 3, illustrating a perspective view of unassembled check valve boat plug system 100 according to an embodiment of the present invention of FIG. 1. Ball valve assembly 120 is shown from a top view showing its relationship with screen 230 and tool receiver 310. Tool receiver 310 mates with tool head 260 of plug cap/tool 130 allowing ball valve assembly 120 to be removably coupled with cylindrical-shaped plug 110, as illustrated in FIG. 4, the final coupled relationship, as shown in FIG. 1. Screen 230 substantially prevents debris including weeds and other materials from entering the boat from the body of water. On occasion a user should check screen 230 and empty the trapped contents so boat draining apparatus 102 is not plugged or in anyway substantially prevented from releasing water from within the boat.

Referring now to FIG. 4, showing a perspective view illustrating the assembly of check valve boat plug system 100 according to an embodiment of the present invention of FIG. 1.

Boat draining apparatus 102 is shown in partially assembled position 450 to illustrate how plug cap/tool 130 is used to tighten or loosen ball valve assembly 120 into or out of cylindrical-shaped plug 110. Within this particular embodiment, ball valve assembly 120 is tightened down into cylindrical-shaped plug 110 until there are enough threads left for cap/tool 130 to be threaded into cylindrical-shaped plug 110. In order to do this, tool head 260 is inserted within the tool receiver 310. The tool head 260 engages the tool receiver 310 such that the ball valve assembly 120 rotates in response to the rotation of the tool head 260.

Next, tool head 260 is removed from tool receiver 310 (shown with clarity in FIG. 3) and cap/tool 130 is then turned end for end and threaded into place in cylindrical-shaped plug 110 creating a final seal using gasket 240.

In order to remove the ball valve assembly 120, the cap/tool 130 is removed from the cylindrical shaped plug 110 and turned end for end, wherein the tool head 260 is inserted within the cylindrical shaped plug 110 to engage the tool receiver 310. The ball valve assembly 120 is rotated in response to rotation of the tool head 260 and the rotation in a direction opposite of that to tighten the ball valve assembly 120 within the cylindrical-shaped plug 110 results in removal of the ball valve assembly 120 from the cylindrical-shaped plug 110.

As shown in the figures, the tool head 260 may be hexagonal in shape and the tool receiver 310 may also be a corresponding hexagonal shape. It will be understood that the shape of the tool head 260 may be any shape that includes a corresponding shaped tool receiver and functions in a manner as described within this disclosure.

According to particular embodiments, the present invention includes a boat having a boat drain hole. The invention further includes a check valve boat plug system 100 coupled within the boat drain hole, the check valve boat plug system comprising a boat draining apparatus 102 as described previously within this disclosure.

In particular embodiments of the present invention, the ball valve assembly 120 may further include a retaining device. The cap/tool 130 may be used to remove the retaining device. Once the retaining device is removed the ball can be removed in order to clean the drain hole of the boat.

Another embodiment of the present invention includes a method of use for a check valve boat plug system. The method comprises the following steps: installing a boat draining apparatus into a boat's drain hole; installing a ball valve assembly into a cylindrical-shaped plug of the boat draining apparatus using a plug cap/tool; removing the plug cap/tool from the ball valve assembly; and installing the plug cap/tool into the cylindrical-shaped plug. Method of use may also comprise the following optional steps: removing the boat from water; disassembling the boat draining apparatus, cleaning the screen and the interior of the boat draining apparatus, and reassembling the boat draining apparatus for a subsequent use.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A boat plug system comprising:
 a cylindrical-shaped plug with two opposed openings;
 a ball valve assembly removably mounted within the cylindrical-shaped plug, wherein the ball valve assembly further comprises a ball, and a sealing ball seat component wherein the sealing ball seat component is shaped to receive the ball when the ball valve assembly is in a sealed position;
 and a plug cap/tool for removably mounting the ball valve assembly within the cylindrical-shaped plug and for sealing at least one of the two opposed openings in the cylindrical-shaped plug;
 wherein the plug cap/tool further comprises a tool head on one side; and
 wherein the tool head removably couples with the ball valve assembly in order to mount or remove the ball valve assembly from within the cylindrical-shaped plug.

2. The boat plug system of claim 1, wherein the ball valve assembly further comprises a screen.

3. The boat plug system of claim 1, wherein the ball valve assembly further comprises a gasket.

4. The boat plug system of claim 1, further comprising mounting tabs for mounting the cylindrical-shaped plug within a drain hole on a boat.

5. A boat plug system comprising:
 a cylindrical-shaped plug with two opposed openings;
 a ball valve assembly removably coupled within the cylindrical-shaped plug;
 wherein the ball valve assembly further comprises a ball, a sealing ball seat component wherein the sealing ball seat component has a frustroconical shape to receive the ball when the ball valve assembly is in a sealed position, and at least one screen;
 and a plug cap/tool comprising a tool head on one end for removably coupling the ball valve assembly within the cylindrical-shaped plug, wherein the ball valve assembly includes a tool receiver shaped to receive the tool head.

6. The boat plug system of claim 5 wherein the cylindrical-shaped plug is internally threaded.

7. The boat plug system of claim 6, wherein the ball valve assembly is threaded for removably coupling within the cylindrical-shaped plug.

8. The boat plug system of claim 7, wherein the plug cap/tool further comprises a threaded coupling opposite the tool head for removably coupling to the cylindrical-shaped plug.

9. The boat plug system of claim 8, wherein the ball valve assembly is threaded into the cylindrical-shaped plug in response to rotation of the tool head inserted into the tool receiver.

10. The boat plug system of claim 9, wherein both the ball valve assembly and the threaded coupling of the plug cap/tool are threaded into the cylindrical-shaped plug.

11. The boat plug system of claim 10, wherein the ball valve assembly is removed from the cylindrical-shaped plug in response to rotation of the tool head inserted into the tool receiver.

12. The boat plug system of claim 5, wherein the ball valve assembly further comprises a gasket.

13. The boat plug system of claim 5, wherein the ball valve assembly further comprises a one way flow-through ball seat component for receiving the ball when the valve is in an unsealed position.

* * * * *